March 7, 1950 M. C. HILLIARD ET AL 2,499,749
VEHICULAR ROOF DOOR DEVICE
Filed Feb. 10, 1949 2 Sheets-Sheet 1
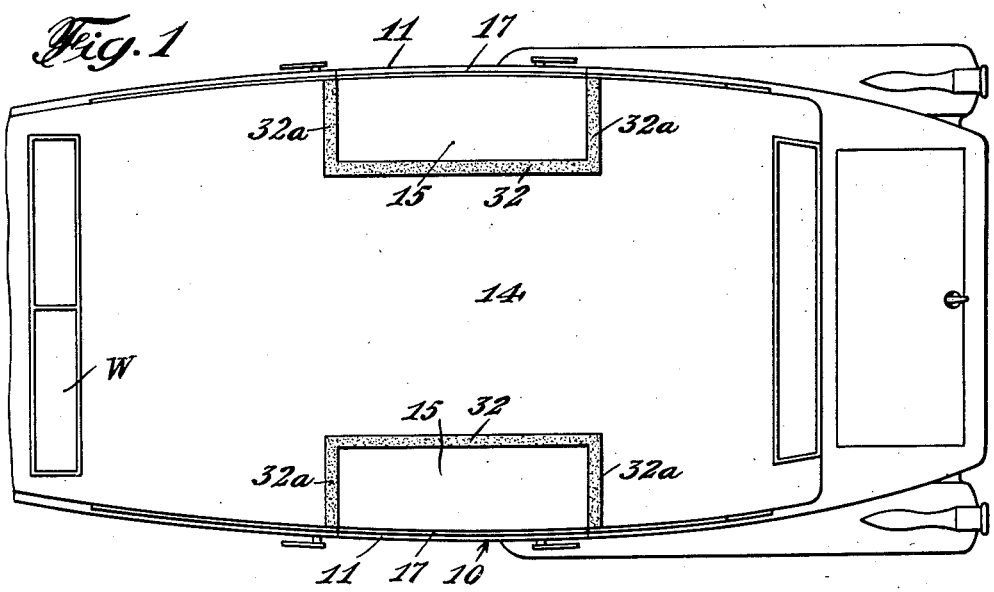
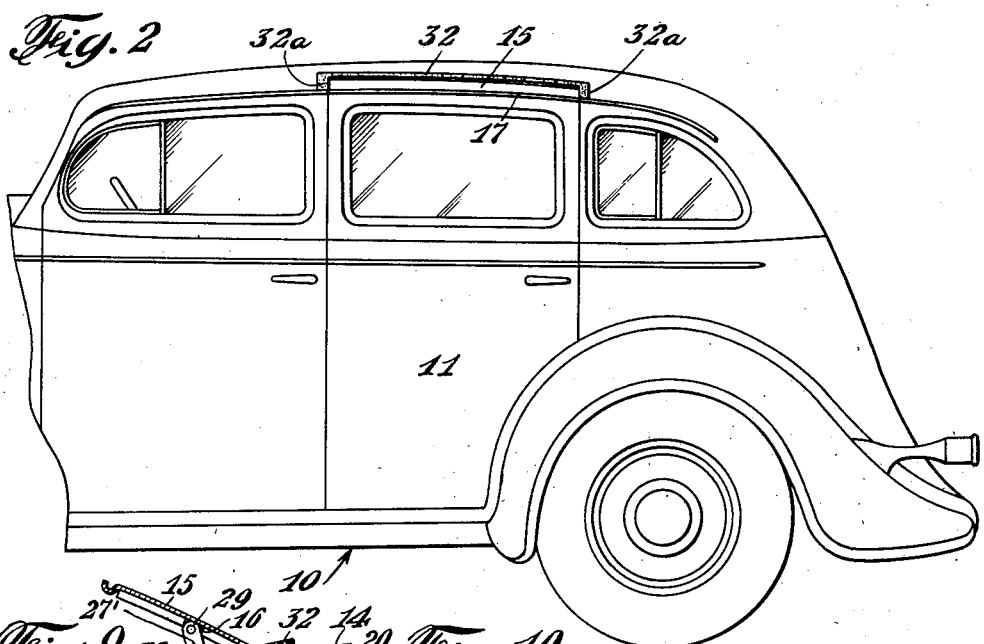
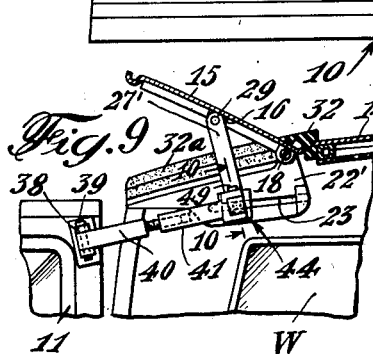
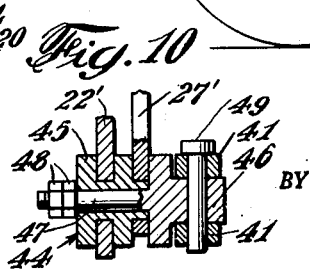
INVENTORS
M.C. HILLIARD
T.E. CARROLL
BY
J.H.F. Presson
ATTORNEY March 7, 1950 M. C. HILLIARD ET AL 2,499,749
VEHICULAR ROOF DOOR DEVICE
Filed Feb. 10, 1949 2 Sheets-Sheet 2
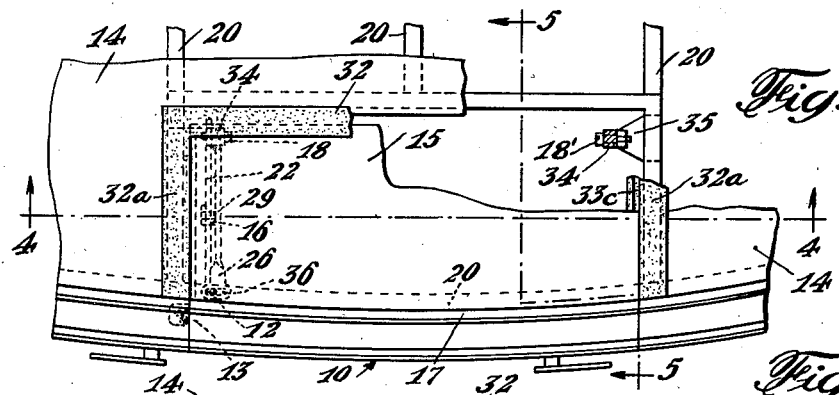
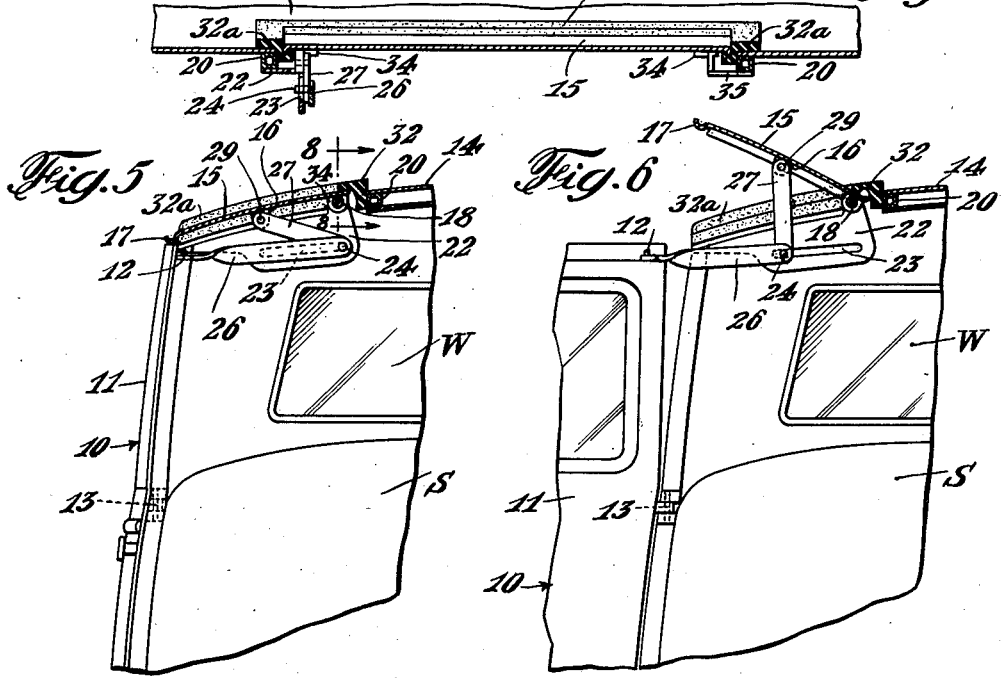
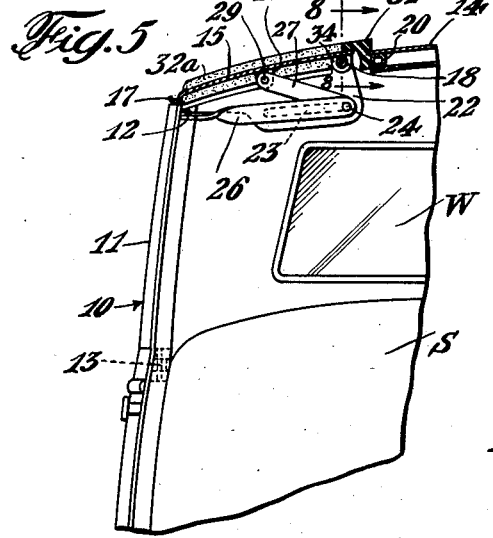
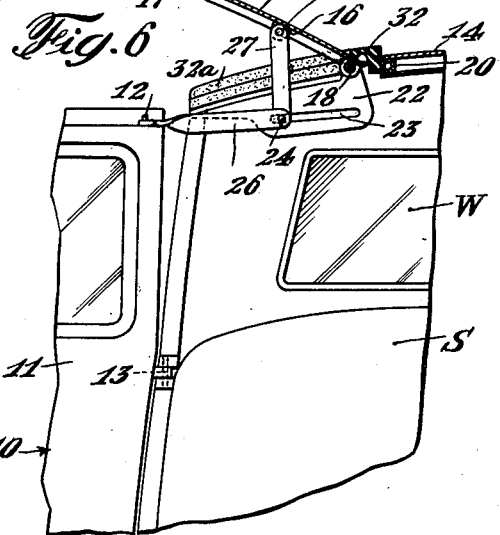
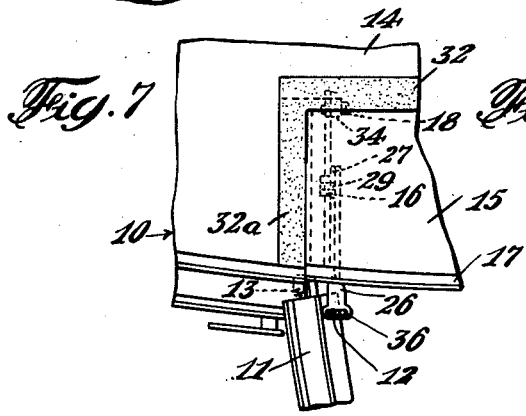
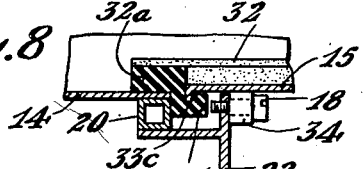
INVENTORS
M.C. HILLIARD
T.E. CARROLL
BY
N.F. Presson
ATTORNEY Patented Mar. 7, 1950

2,499,749

UNITED STATES PATENT OFFICE 2,499,749

VEHICULAR ROOF DOOR DEVICE

Mack C. Hilliard, Larchmont, and Thomas E. Carroll, New York, N. Y.

Application February 10, 1949, Serial No. 75,624

7 Claims. (Cl. 296—44)

This invention relates to an improved vehicular door device for insertion in the top of an automobile or other vehicle to provide increased headroom over a doorway of the vehicle for persons entering and leaving the same.

The streamlined and low slung bodies of modern automobiles make it increasingly difficult for persons to enter and leave cars of the closed body types without annoyance and possibility of injury due to the insufficient headroom encountered. This is especially undesirable in the case of taxicabs in which passengers often enter or leave the vehicles hurriedly and without due care, and irate passengers who are embarrassed or injured as a result of low headroom are inclined to charge the luckless driver or the owner with negligence in the matter. Similarly the headroom available in the rear doors of ambulances usually is insufficient to enable the front stretcher bearer to enter with a stretcher carrying a sick or injured person, without stooping and thereby placing an undue strain on the bearer.

Vehicular roof door devices operable by opening and closing a side door of a vehicle have heretofore been proposed, but they have various disadvantages which make them impractical for the purposes of the instant invention. In some of the proposed prior devices the actuating elements were unsightly and subject to binding and involved special lubricating problems; others which contemplated simpler linkage or lever systems would have resulted in too much strain on the hinges of the roof doors and generally were too rigid and inflexible under the varying conditions to which they would have been subjected in service; those which proposed to employ more flexible lever systems were too cumbersome and would have complicated unduly the body construction of the car; and still others were not suitable for use with cars in which the rear side doors are hinged at their leading or front edges and open at their trailing or rear edges as in the present models of most automobiles.

One of the objects of the invention is to provide a vehicular roof door device in which the foregoing disadvantages of prior proposed devices are obviated, and which is sufficiently rugged to withstand the strains and hard usage to which such a device is subjected in service, while possessing a degree of flexibility adequate to compensate for different and varying operating conditions encountered.

Another object is a device of the character described which is relatively simple in construction and which does not unduly complicate the body structure of a car or other vehicle, and which is not obtrusive or unsightly.

A further object is a suitable means for applying an operating force to the roof door to open and close the same in a manner to prevent undue strain on the door at the points where it is hinged to the car roof, and to reduce the force required to operate the roof door.

Other objects and advantages will be apparent from the following detailed description of two embodiments of the invention, taken in connection with the accompanying drawings in which:

Figs. 1 and 2 are top and side views, respectively, of an automobile having roof doors adjoining and operable by the rear side doors of the car, constructed in accordance with our invention;

Fig. 3 is a top plan view of one of the roof doors of Fig. 1, with a portion of the car top and roof door broken away to show the supporting roof frame;

Fig. 4 is a sectional view, taken along the line 4—4 of Fig. 3, showing certain details of the mounting and sealing structures for the roof door;

Fig. 5 is a sectional view, taken along the line 5—5 of Fig. 3, illustrating one form of operating mechanism for the roof door, with the door in closed position;

Fig. 6 is a view similar to Fig. 5, showing the roof door in open position;

Fig. 7 is a fragmentary view of the top of the side door and roof door in open position as shown in Fig. 6, to illustrate certain details of the operating mechanism;

Fig. 8 is a detail view taken along the line 8—8 of Fig. 5;

Fig. 9 shows a modified form of the roof-door operating mechanism; and

Fig. 10 is a fragmentary sectional view taken along the line 10—10 of Fig. 9.

Referring to Figs. 1 and 2, the closed body 10 of the automobile or taxicab shown has four doors, with the two rear side doors 11 thereof having associated therewith metal roof doors 15 inserted in the top 14 of the car. The windshield is indicated by reference letter W in Fig. 1 in order to identify this element in Figs. 5 and 6 hereinafter described. Both the front and rear side doors are shown as hinged at their front or leading edges, as by hinges 13, and open at their rear or trailing edges, in accordance with the present prevailing practice. The invention may be applied either to front or rear doors which may be hinged either at their front or rear edges. Sealing strips 32, 32a of relatively soft pliable material, such as rubber, extend around the edge of the roof opening in which each roof door is inserted, to seal the roof door against the weather when the door is closed. As seen in Fig. 2, the front edge of each roof door terminates in a rain gutter 17 which provides a continuation of the usual gutter extending along the top of the car.

As shown in Figs. 3 to 8, the box-steel girder structure 20 of the car roof is fabricated on each side of the car to provide an opening slightly larger than the outline of the roof door 15 received therein. At the left hand end of the roof door, as viewed in Figs. 3 and 4, the girder structure 20 has rigidly secured thereto, as by welding, a steel plate member 22 in the manner shown in Figs. 5, 6 and 8. This plate receives a bolt or stud 18 which passes through an ear or lug 34 welded to the rear edge of the under side of the roof door. The ear 34 is freely rotatable about the stud 18 and thus provides a hinge at an edge of the door 15. The right hand end of the roof door is also hinged, as seen in Figs. 3 and 4, by means of an ear 34 through which passes a bolt or stud 18' that screws into and is carried by a supporting tongue 35 welded to the girder structure 20.

The actuating means for each roof door, as seen in Figs. 4 to 7, comprises two levers or link members 26 and 27 which are pivotally connected at their adjacent ends by means of a bolt or stud 24, which pivotal means is slidably mounted in a guideway 23 in the rigid plate 22. In the embodiment illustrated in the foregoing figures, the guideway may comprise an elongated slot extending in a substantially horizontal plane. The outer end of lever 26 is pivotally connected to the upper hinged edge of the car door 11 by means of a stud 12 secured to the door. As seen in Fig. 7 the outer end of the lever has a transversely extending slot 36 therein through which the stud 12 passes with a loose fit; this provides lateral movement relatively between the end of the lever and the stud as the car door is swung open to varying degrees, thereby compensating for the arcuate movement of the car door and affording a desired flexibility of the actuating system to prevent lateral strain on, or lateral deflection of, either of the levers as the car door is opened and closed.

The upper end of the lever 27 is pivotally connected, by means of a bolt or stud 29, Figs. 5 and 6, to an ear or lug 16 welded to the under side of the roof door 15 at a point intermediate (approximately midway between) the hinged edge of the door and the free edge thereof. This causes the raising and retracting forces necessary for opening and closing the roof door to be applied at a place and in a manner to obtain a substantial mechanical advantage due to the lever action, and also reduces the strain on the roof door at the places where it is hinged to the car roof. The length of the lever 27 relative to that of lever 26 determines the maximum height to which the roof door will open. The bolt or stud 24, which pivotally connects the adjacent ends of levers 27 and 27, reciprocates in the slotted guideway 26 when the car door is opened and closed, as seen in Figs. 5 and 6. The members 22, 26 and 27, and also the studs or bolts which pivotally connect and coact with the members, preferably are fabricated from or plated with a suitable rust-proof metal or alloy, and may readily be lubricated when desirable or necessary. In Figs. 5 and 6 the windshield W and the back of the driver's seat S of the car also are shown.

The front edge of the roof door may, as hereinbefore set forth, terminate in a small rain gutter or trough 17. The roof door, when closed, may be sealed against the entrance of water in any suitable manner. In the form illustrated the hinged edge of the door has a small upwardly projecting lip, seen in Figs. 5 and 6, which enters a recess in the under side of the strip 32 of rubber or other sealing compound, and the two ends of the door seat within sealing strips 32a. As shown in Fig. 8, the end of each door 15 may each have a turned edge which seats in a slot 33c adjoining the portion 32b of the sealing strip. If desired, the sealing strips 32 and 32a may be recessed in the door opening so as to be flush with the top 14 of the car. In either case the sealing strips may be secured to the roof structure by a waterproof cement compound or in any other suitable manner.

Figs. 9 and 10 illustrate another embodiment of the actuating mechanism, in which means are provided to vary the effective length of one of the roof door operating levers relative to the other lever, and the pivotal means for the levers are modified. Lever 27' corresponds to the lever 27 of the first embodiment, but lever 26 of the first form has been replaced by a lever comprising longitudinally adjustable rod members 40 and 41. As seen in Fig. 9 the rod 40 has a screw-threaded end received within a threaded bore in rod 41, whereby the effective length of the lever may be varied by rotating either rod relative to the other, which arrangement enables any desired adjustment of the limits of movement of the roof door to be made, for example, to initially produce a desired action or to compensate for wear of the parts or for shrinkage or deformation of the sealing strips around the roof door.

The outer end of the rod 40 of the lever is provided with an eye and is received within a lug 38 welded to the upper hinged portion of the car door 11; a bolt or pin 39 passing through the eye and lug pivotally connects the lever to the car door. In order to provide for lateral movement of the outer end of the lever to compensate for the arcuate movement of the door, the inner end of rod 41 is bifurcated as seen in Fig. 10 and is pivotally connected to the head 46 of a stud or bolt 47 of a bearing block assembly 44, by means of a pin 49. Either of the pins 39 or 49 may be withdrawn to effect adjustment of the length of the lever when in service. The stud 47 passes through a block 45 of an assembly 44 which is fastened on the stud by nuts 48. The block 45 has a groove therein and is slidably mounted in the slot or guideway 23 of plate member 22' to enable reciprocating movement therein. Slide block 45 also provides a pivotal bearing for the end of lever 27', and the reciprocable assembly 44 thus pivotally connects the adjacent ends of the actuating levers together and also enables lateral pivotal movement of the lever structure 40, 41. The lower right hand end of the plate 22', as seen in Fig. 9, has the slot or guideway 23 extending through its edge portion to enable the pivotal assembly 44 initially to be inserted in the guideway, after which the open end of the slot may be closed with a small metal corner piece as shown in the figure in order to stiffen the slotted end of the plate. The metal piece may be secured to the plate in any suitable manner, as by machine screws or rivets or by welding.

While the invention has been specifically described in connection with taxicabs and other automobiles, it may also be applied to delivery cars, trucks and the like. Similarly, the headroom in passenger planes may be increased for entry and exit of the passengers and crews, since the roof door may be fitted into the streamlined fuselage of a plane and operated in substantially the same manner as in an automobile. Many other and varied forms and uses doubtless will occur to those versed in the art without departing from the invention which is, therefore, not limited either in structure or in use except as indicated by the scope of the appended claims.

What is claimed is:

1. In a closed vehicle body having a doorway and a door mounted therein and hingedly secured thereto at one of its edges for horizontal swinging movement, the roof structure of said body having an opening therein communicating with the top of said doorway, a roof door for closing said opening in the roof structure and hingedly secured thereto for vertical swinging movement, and actuating means for automatically raising and lowering the roof door as said first named door is opened and closed, respectively, comprising a member rigidly secured to said vehicle body and having a guideway formed therein, a first lever and a second lever and means pivotally connecting adjacent ends of said levers together, said pivotal means being slidably mounted in said guideway for reciprocating movement therein, means pivotally connecting the other end of said first lever to the upper hinged edge portion of said first named door at a point spaced laterally from the hinge line of said door, said last named pivotal connection describing an arcuate path substantially in a horizontal plane during swinging movement of said first named door, means pivotally connecting the other end of said second lever to said roof door to effect vertical swinging movement thereof in response to horizontal swinging movement of said first named door, and means providing for relative lateral movement between the lever structure and said pivotal connection movable in an arcuate path thereby to prevent the arcuate movement from imposing injurious bending or torsional strains on the lever structure.

2. In a closed vehicle body having a doorway and a door mounted therein and hingedly secured thereto at one of its edges for horizontal swinging movement, the roof structure of said body having an opening therein communicating with the top of said doorway, a roof door for closing said opening in the roof structure and hingedly secured thereto at one of its edges for vertical swinging movement, and actuating means for automatically raising and lowering the roof door as said first named door is opened and closed, respectively, comprising a member rigidly secured to said roof structure and having a guideway formed therein, a first lever and a second lever and means pivotally connecting adjacent ends of said levers together, said pivotal means being slidably mounted in said guideway for reciprocating movement therein, means pivotally connecting the other end of said first lever to the upper hinged edge portion of said first named door at a point spaced laterally from the hinge line of said door, said last named pivotal connection describing an arcuate path substantially in a horizontal plane during swinging movement of said first named door, means pivotally connecting the other end of said second lever to said roof door at a point intermediate the hinged edge thereof and its opposite free edge, and means providing for relative lateral movement between the lever structure and said pivotal connection movable in an arcuate path thereby to prevent the arcuate movement from imposing injurious bending or torsional strains on the lever structure.

3. In a closed vehicle body having a doorway and a door mounted therein and hingedly secured thereto at one of its edges for horizontal swinging movement, the roof structure of said body having an opening therein communicating with the top of said doorway, a roof door for closing said opening in the roof structure and hingedly secured thereto at one of its edges for vertical swinging movement, and actuating means for automatically raising and lowering the roof door as said first named door is opened and closed, respectively, comprising a member rigidly secured to said roof structure and having a guideway formed therein, a first lever and a second lever and a slide block pivotally connecting adjacent ends of said levers, said block being slidably mounted in said guideway for reciprocating movement therein, the other end of said first lever being pivotally connected to said first named door at a point adjacent to the upper hinged edge thereof at a point spaced laterally from the hinge line of said door, said last named pivotal connection describing an arcuate path substantially in a horizontal plane during swinging movement of said first named door, the other end of said second lever being pivotally connected to said roof door at a point intermediate the hinged edge thereof and its opposite free edge, and means including said slide block for pivotally connecting said adjacent end of the first lever in a manner to provide a lateral movement of said other end of the lever in a horizontal plane thereby to prevent the arcuate movement of the pivotal connection at said other end of the lever from imposing injurious bending or torsional strains on the lever structure.

4. In a closed vehicle body having a doorway and a door mounted therein and hingedly secured thereto at one of its edges for horizontal swinging movement, the roof structure of said body having an opening therein communicating with the top of said doorway, a roof door for closing said opening in the roof structure and hingedly secured thereto at one of its edges for vertical swinging movement, and actuating means for automatically raising and lowering the roof door as said first named door is opened and closed, respectively, comprising a member rigidly secured to said roof structure and having a guideway formed therein, a first lever and a second lever and a slide block pivotally connecting adjacent ends of said levers, said block being slidably mounted in said guideway for reciprocating movement therein, the other end of said first lever being pivotally connected to said first named door at a point adjacent to the upper hinged edge thereof at a point spaced laterally from the hinge line of said door, said last named pivotal connection describing an arcuate path substantially in a horizontal plane during swinging movement of said first named door, the other end of said second lever being pivotally connected to said roof door at a point approximately midway between the hinged edge thereof and its opposite free edge, and means including said slide block for pivotally connecting said adjacent end of the first lever in a manner to provide a lateral movement of said other end of the lever in a horizontal plane thereby to prevent the arcuate movement of the pivotal connection at said other end of the lever from imposing injurious bending or torsional strains on the lever structure.

5. In a closed vehicle body having a doorway and a door mounted therein and hingedly secured thereto at one of its edges for horizontal swinging movement, the roof structure of said body having an opening therein communicating with the top of said doorway, a roof door for closing said opening in the roof structure and hingedly secured thereto at one of its edges for vertical swinging movement, and actuating means for automatically raising and lowering the roof door as said first named door is opened and closed, respectively, comprising a metal plate member rigidly secured to said roof structure and having an elongated slot formed therein, a first lever and a second lever and a slide block pivotally connecting adjacent ends of said levers, said block being slidably mounted in said slot for reciprocating movement therein, the other end of said first lever being pivotally connected to said first named door at a point adjacent to the upper hinged edge thereof at a point spaced laterally from the hinge line of said door, said last named pivotal connection describing an arcuate path substantially in a horizontal plane during swinging movement of said first named door, the other end of said second lever being pivotally connected to said roof door at a point intermediate the hinged edge thereof and its opposite free edge, and means including said slide block for pivotally connecting said adjacent end of the first lever in a manner to provide a lateral movement of said other end of the lever in a horizontal plane thereby to prevent the arcuate movement of the pivotal connection at said other end of the lever from imposing injurious bending or torsional strains on the lever structure.

6. In a closed vehicle body having a doorway and a door mounted therein and hingedly secured thereto at one of its edges for horizontal swinging movement, the roof structure of said body having an opening therein communicating with the top of said doorway, a roof door for closing said opening in the roof structure and hingedly secured thereto for vertical swinging movement, and actuating means for automatically raising and lowering the roof door as said first named door is opened and closed, respectively, comprising a member rigidly secured to said vehicle body and having a guideway formed therein, a first lever and a second lever and a slide block pivotally connecting adjacent ends of said levers, said block being slidably mounted in said guideway for reciprocating movement therein, means pivotally connecting the other end of said first lever to the upper hinged edge portion of said first named door at a point spaced laterally from the hinge line of said door, said last named pivotal connection describing an arcuate path substantially in a horizontal plane during swinging movement of said first named door, means pivotally connecting the other end of said second lever to said roof door to effect vertical swinging movement thereof in response to horizontal swinging movement of said first named door, means including said slide block for pivotally connecting said adjacent end of the first lever in a manner to provide a lateral movement of said other end of the lever in a horizontal plane thereby to prevent the arcuate movement of the pivotal connection at said other end of the lever from imposing injurious bending or torsional strains on the lever structure, one of said levers comprising two rods having interengaging screw-threaded portions such that rotation of one rod relative to the other will vary the limits of movement of said roof door.

7. In a closed vehicle body having a doorway and a door mounted therein and hingedly secured thereto at one of its edges for horizontal swinging movement, the roof structure of said body having an opening therein communicating with the top of said doorway, a roof door for closing said opening in the roof structure and hingedly secured thereto at one of its edges for vertical swinging movement, and actuating means for automatically raising and lowering the roof door as said first named door is opened and closed, respectively, comprising a member rigidly secured to said roof structure and having a guideway formed therein, a first lever and a second lever and means pivotally connecting adjacent ends of said levers together, said pivotal means being slidably mounted in said guideway for reciprocating movement therein, the other end of said first lever being pivotally connected to said first named door at a point adjacent to the upper hinged edge thereof at a point spaced laterally from the hinge line of said door, said last named pivotal connection describing an arcuate path substantially in a horizontal plane during swinging movement of the first named door, the other end of said second lever being pivotally connected to said roof door at a point intermediate the hinged edge thereof and its opposite free edge, and lost motion means to provide relative lateral movement of said other end of the first lever sufficient to prevent the arcuate path of movement of said first named door to which the lever is pivotally connected from imposing injurious bending or torsional strains on the lever structure.

MACK C. HILLIARD.
THOMAS E. CARROLL.

REFERENCES CITED

The following references are of record in the file of this patent:

UNITED STATES PATENTS

| Number | Name | Date |
|---|---|---|
| 1,603,181 | Aborn | Oct. 12, 1926 |
| 1,672,559 | Doble | June 5, 1928 |
| 2,102,110 | Burkey | Dec. 14, 1937 |
| 2,141,298 | Heinz | Dec. 27, 1938 |
| 2,208,309 | Leonard | July 16, 1940 |